US012632010B2

(12) United States Patent
Dos Santos Pedrosa et al.

(10) Patent No.: US 12,632,010 B2
(45) Date of Patent: May 19, 2026

(54) ROTATING BEZEL FOR A TIMEPIECE CASE

(71) Applicant: ROLEX SA, Geneva (CH)

(72) Inventors: Pedro Manuel Dos Santos Pedrosa, Plan-les-Ouates (CH); Jean-Baptiste Robin, Annemasse (FR)

(73) Assignee: ROLEX SA, Geneva (CH)

( * ) Notice: Subject to any disclaimer, the term of this patent is extended or adjusted under 35 U.S.C. 154(b) by 281 days.

(21) Appl. No.: 18/252,458

(22) PCT Filed: Nov. 10, 2021

(86) PCT No.: PCT/EP2021/081258
§ 371 (c)(1),
(2) Date: May 10, 2023

(87) PCT Pub. No.: WO2022/101274
PCT Pub. Date: May 19, 2022

(65) Prior Publication Data
US 2023/0418229 A1 Dec. 28, 2023

(30) Foreign Application Priority Data
Nov. 11, 2020 (CH) ....................................... 1445/20

(51) Int. Cl.
*G04B 19/28* (2006.01)
*G04B 19/18* (2006.01)

(52) U.S. Cl.
CPC ........... *G04B 19/283* (2013.01); *G04B 19/18* (2013.01)

(58) Field of Classification Search
CPC ...... G04B 19/283; G04B 19/18; G04B 19/28; G04B 19/223; G04B 37/22; G04B 19/22; G04B 19/225; G04B 37/0008
See application file for complete search history.

(56) References Cited

U.S. PATENT DOCUMENTS 7,182,508 B2 2/2007 Bertrand et al.
9,188,959 B2 11/2015 Bertrand et al.
11,625,006 B2 * 4/2023 Garcin ................... G04B 19/18 368/295
11,809,139 B2 11/2023 Kanmaz
11,886,148 B2 * 1/2024 Boaron ................ G04B 19/283
2005/0007890 A1 1/2005 Bertrand et al.
2005/0013204 A1 1/2005 Hiranuma et al.
(Continued)

FOREIGN PATENT DOCUMENTS

CH 697669 B1 1/2009
DE 1814395 U 6/1960
(Continued)

OTHER PUBLICATIONS

International Search Report and Written Opinion dated Feb. 4, 2022 in corresponding application No. PCT/EP2021/081258; with English partial translation and partial machine translation (total 17 pages).
(Continued)

*Primary Examiner* — Edwin A. Leon
(74) *Attorney, Agent, or Firm* — Seckel IP, PLLC

(57) ABSTRACT

The rotating bezel (10) for a timepiece case includes: a first axis (A10), and a single frustoconical surface (1*a*) centered on the first axis and to be acted on by at least one press element (51) at an interface (110) between the bezel (10) and the middle (3) of the timepiece case.

20 Claims, 11 Drawing Sheets

(56) References Cited

U.S. PATENT DOCUMENTS

| | | | | |
|---|---|---|---|---|
| 2006/0193210 | A1 | 8/2006 | Damasko | |
| 2008/0273428 | A1 | 11/2008 | Damasko | |
| 2013/0201804 | A1 | 8/2013 | Bertrand et al. | |
| 2014/0098650 | A1* | 4/2014 | Antille | G04B 19/283 368/295 |
| 2015/0227113 | A1* | 8/2015 | Cattaneo | G04B 19/223 368/295 |
| 2019/0324405 | A1 | 10/2019 | Kanmaz | |
| 2020/0301366 | A1 | 9/2020 | Boaron et al. | |
| 2021/0132544 | A1* | 5/2021 | Dos Santos Predrosa | G04B 45/00 |

FOREIGN PATENT DOCUMENTS

| | | | |
|---|---|---|---|
| DE | 202005003029 | U1 | 10/2005 |
| EP | 1416341 | A2 | 5/2004 |
| EP | 2624076 | A1 | 8/2013 |
| EP | 3557336 | A1 | 10/2019 |
| EP | 3712716 | A1 | 9/2020 |
| FR | 2192331 | A1 | 2/1974 |
| JP | 2005-077415 | A | 3/2005 |
| JP | 2018-146505 | A | 9/2018 |
| JP | 6741397 | B2 | 8/2020 |

OTHER PUBLICATIONS

EP Office Action dated Aug. 20, 2025 in counterpart application No. EP 21811279.5; with English machine translation (total 14 pages).

JP Office Action dated Sep. 16, 2025 in counterpart application No. JPP2023-528242; with English machine translation (total 14 pages) (note: D1, DE1814395 is not listed in this IDS since it is already of record in this application).

* cited by examiner

IV-IV

ROTATING BEZEL FOR A TIMEPIECE CASE

The invention relates to a rotating bezel for a timepiece case. The invention relates also to a timepiece case comprising such a rotating bezel. The invention finally relates to a timepiece comprising such a timepiece case or such a rotating bezel.

BACKGROUND ART

The document EP2624076 discloses a bezel design in which the annular section is minimized so as to be arranged on an annular seat of a middle, the surface extent of which is also minimized. Such a bezel comprises indexing means and guiding and/or braking means disposed on one and the same radius centered on the axis of said bezel. That is made possible by the insertion of a ring which is disposed at the interface of helical return springs (disposed on the annular seat of the middle) and of the bottom face of the bezel, an indexing ratchet passing through said ring so as to cooperate with an indexing toothing disposed on said bottom face of the bezel on said bezel radius. Even though this solution is perfectly efficient, it can be further enhanced.

SUMMARY OF THE INVENTION

The aim of the invention is to provide a rotating bezel for a timepiece case that makes it possible to enhance the systems known from the prior art. In particular, the invention proposes a rotating bezel that is simple and reliable and whose radial bulk is minimized.

A rotating bezel according to the invention is defined by point 1 below.

1. A rotating bezel for a case of a timepiece, the bezel comprising:
   a first axis, and
   a single frustoconical surface centered on the first axis and intended to be acted upon by at least one pressing element at an interface between the bezel and a middle of a case of a timepiece.

Different bezel embodiments are defined by points 2 to 5 below.

2. The bezel as defined in point 1, wherein the frustoconical surface has an angle with the axis between 30° and 80°.
3. The bezel as defined in point 1 or 2, wherein the single frustoconical surface has a vertex oriented toward the top of the bezel.
4. The bezel as defined in point 1 or 2, wherein the single frustoconical surface has a vertex oriented toward the bottom of the bezel.
5. The bezel as defined in one of the preceding points, wherein it comprises indexing or actuation elements disposed on a second circle centered on the first axis and having a second radius.

A timepiece case according to the invention is defined by point 6 below.

6. A timepiece case comprising a middle and a bezel as defined in one of points 1 to 5.

Different timepiece case embodiments are defined by points 7 to 14 below.

7. The timepiece case as defined in the preceding point, wherein it comprises at least one pressing element at an interface between the bezel and the middle, the at least one pressing element being intended to press on the single frustoconical surface.

8. The timepiece case as defined in the preceding point, wherein the at least one pressing element comprises a ball or a pressing element having a hemispherical or substantially hemispherical end and/or wherein the at least one pressing element is disposed on a first circle centered on the first axis and having a first radius.
9. The timepiece case as defined in one of points 6 to 8 and comprising a bezel as defined in point 5, wherein it comprises a shaft having a second axis parallel or substantially parallel to the first axis, the shaft being arranged to cooperate with the indexing or actuation elements and the shaft, in particular the second axis being disposed on a third circle centered on the first axis and having a third radius.
10. The timepiece case as defined in the preceding point, wherein the shaft is a shaft that is movable in rotation about the second axis.
11. The timepiece case as defined in the preceding point, wherein the elements take the form of pins provided to cooperate with a pinion or a Maltese cross secured to the shaft.
12. The timepiece case as defined in point 9, wherein the shaft is a shaft that is movable in translation on the second axis.
13. The timepiece case as defined in the preceding point, wherein the elements form a toothing provided to cooperate with a tooth secured to the shaft.
14. The timepiece case as defined in one of points 8 to 13, wherein a ratio:
    of the largest of the first and second radii
    to
    the smallest of the first and second radii
    is less than 1.2, even less than 1.1.

A timepiece according to the invention is defined by point 15 below.

15. A timepiece, notably a watch, in particular a wristwatch, comprising a case as defined in one of points 6 to 14 and/or a bezel as defined in one of points 1 to 5.

BRIEF DESCRIPTION OF THE DRAWINGS

The attached drawings represent, by way of examples, two embodiments of a timepiece.

DETAILED DESCRIPTION OF PARTICULAR EMBODIMENTS

Figure 1:
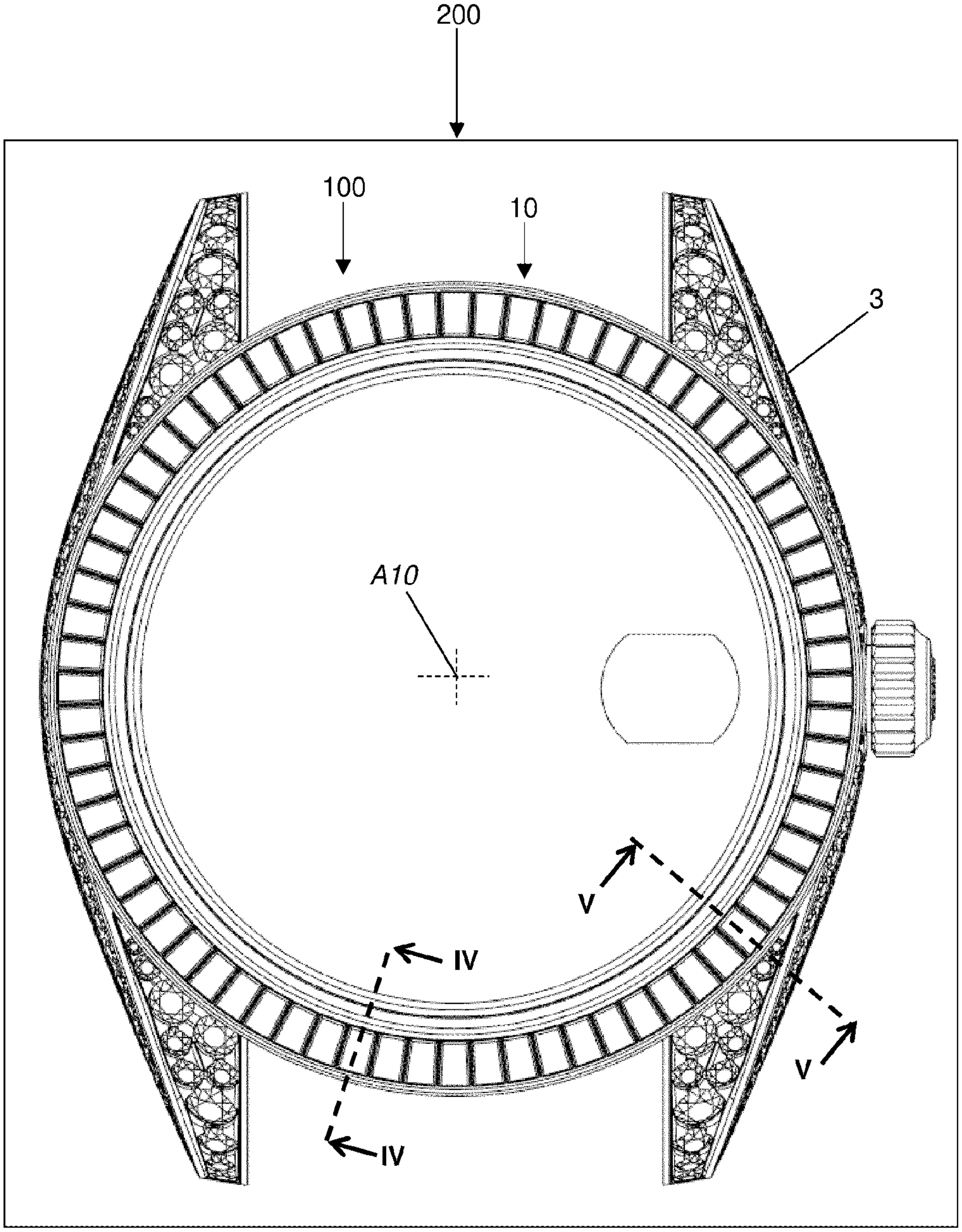
FIG. 1 is a top view of a first embodiment of a timepiece.

A first embodiment of a timepiece 200 is described hereinbelow with reference to FIGS. 1 to 5.

The timepiece 200 is, for example, a watch, in particular a wristwatch.

The timepiece 200 comprises a horological movement intended to be mounted in a timepiece case 100 in order to protect it from the outside environment.

The horological movement can be an electronic movement or a mechanical movement, notably an automatic movement.

The timepiece case 100 comprises:

a middle 3, a bezel 10, a case back, and a glass 8.

The bezel is a rotating bezel, that is to say a bezel that is movable in rotation about an axis A10 relative to the rest of the timepiece case, notably relative to the middle 3 on which it is mounted.

Figure 2:
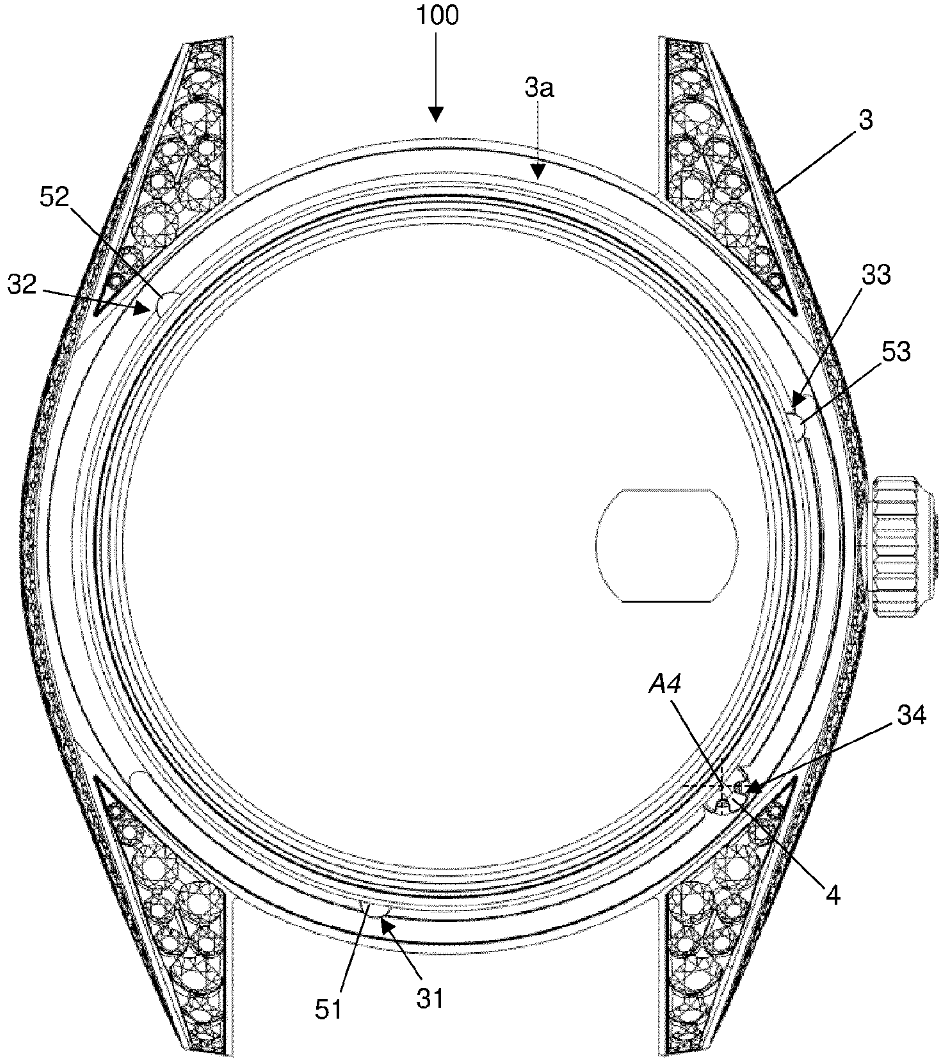
FIG. 2 is a top view of the first embodiment of the timepiece, with bezel removed.

The middle 3 is provided with an annular seat 3*a*, more particularly visible in FIG. 2. This seat 3*a* comprises different housings 31, 32, 33 in which are arranged pressing elements 51, 52, 53, such as balls, each mounted on a helical spring 61, 62, 63. This seat 3*a* also comprises a housing 34 in which is pivoted a shaft 4 on an axis A4 parallel or substantially parallel to the axis A10 of rotation of the bezel 10.

The rotating bezel 10 for a case 100 of a timepiece 200 comprises:

a first axis A10, and a single frustoconical surface 1*a* centered on the first axis A10 and intended to be acted upon by at least one pressing element 51, 52, 53 at an interface 110 between the bezel 10 and the middle 3, notably at an interface 110 between the bezel 10 and the seat 3*a* of the middle 3.

Preferably, the bezel has a form of revolution or substantially of revolution about the axis A10.

In the first embodiment, the bezel 10 comprises for example:

a bezel ring 1, and at least one decorative element 2.

The ring 1 comprises:

a top face 10*b* that is hollowed in order to receive the at least one decorative element 2, in particular precious stones 2, and a bottom face 10*a* having the frustoconical surface 1*a*.

Figure 4:
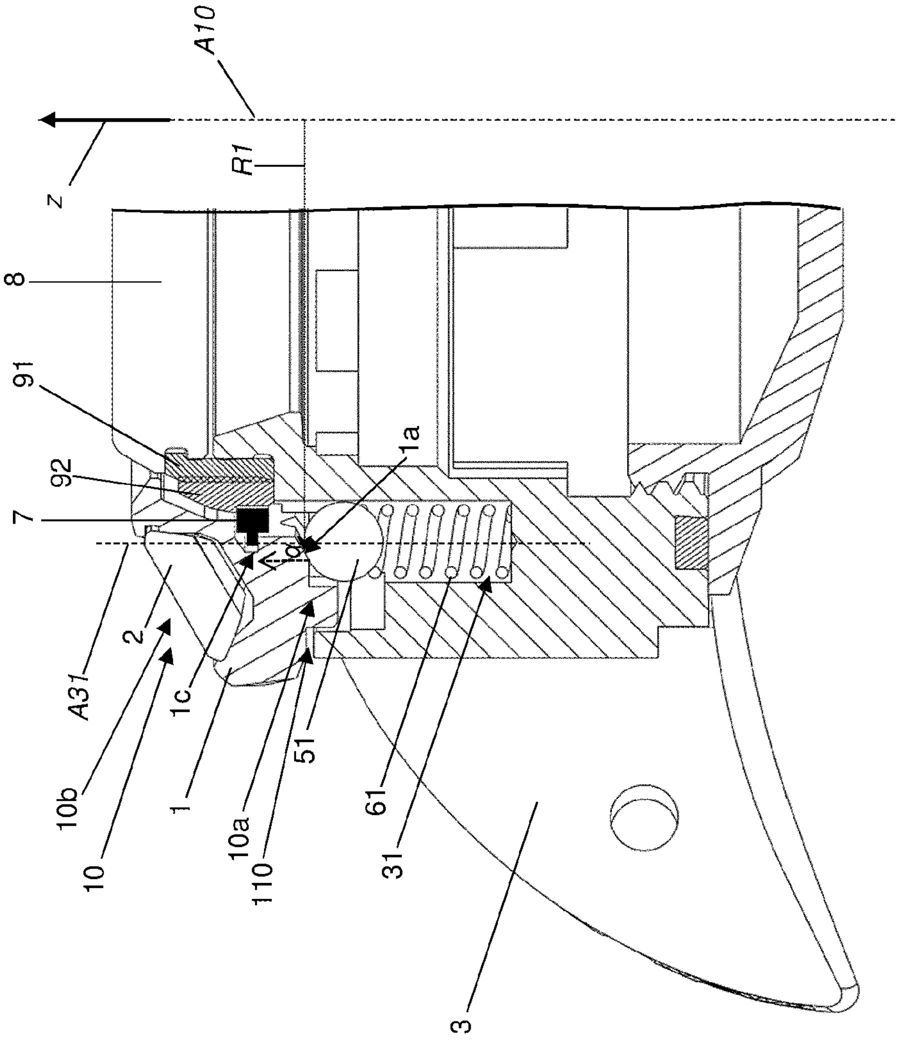
FIG. 4 is a partial radial cross-sectional view on the plane IV-IV of FIG. 1 of the first embodiment of the timepiece.

FIG. 4 illustrates a radial section of the timepiece passing through an axis A31 of the housing 31 formed on the annular seat 3*a* of the middle 3. The ball 51 is pressed by the spring 61 against the frustoconical surface 1*a*. Thus, a punctual contact is formed between the ball 51 and the frustoconical surface 1*a*. The same advantageously applies with respect to the other pressing elements 52, 53 respectively returned elastically against the frustoconical surface 1*a* by their springs 62 and 63. The frustoconical surface 1*a* formed on the bottom surface 10*a* of the bezel 10 is, here, disposed on a first radius R1 centered on the axis A10 of the bezel 10.

Preferably, the frustoconical surface 1*a* forms an angle α (half-angle at the vertex of the frustoconical surface) of between 30° and 80° with a vector z arranged along the direction of the axis A10 or with the axis A10. By convention, this vector z is oriented from the bottom of the case 100 toward the glass of the case 100. In the first embodiment as illustrated, the frustoconical surface 1*a* is oriented in such a way that it approaches the axis A10 in the direction defined by the vector z. In other words, the single frustoconical surface 1*a* has a vertex oriented toward the top of the bezel. The top of the bezel corresponds here to the top face of the bezel, namely the visible face of the bezel when the latter is mounted on the middle. In other words, the vertex of the conical surface in extension of the single frustoconical surface is located above the visible face of the bezel.

Figure 5:
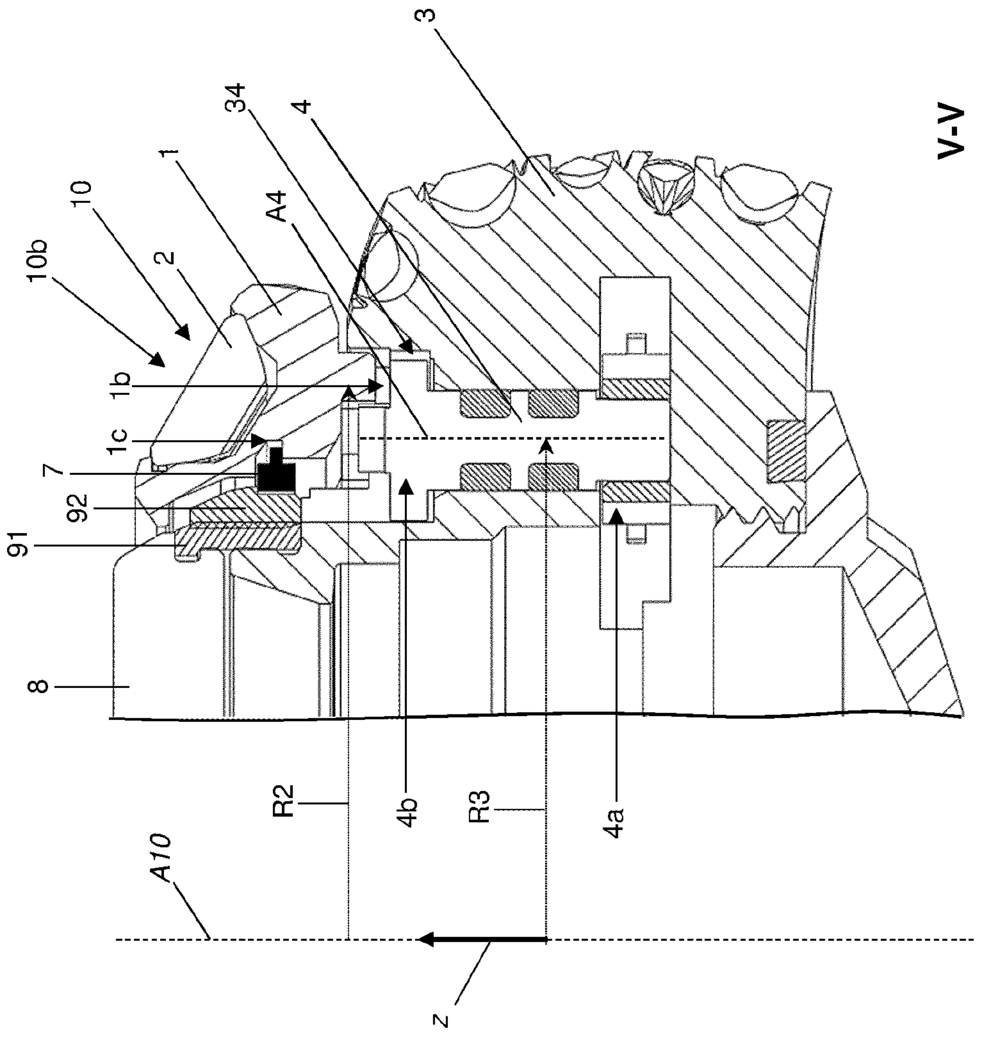
FIG. 5 is a partial radial cross-sectional view on the plane V-V of FIG. 1 of the first embodiment of the timepiece.

FIG. 5 illustrates a radial section of the timepiece passing through the axis A4. The shaft 4 comprises a first actuation portion 4*a* of the horological movement, disposed at a first longitudinal end, and a second portion 4*b* disposed at a second longitudinal end opposite the first longitudinal end. This portion 4*b* is provided to be actuated by actuation elements 1*b* of the ring 1 of the bezel 10. The actuation elements 1*b* are disposed on a second circle centered on the first axis A10 and having a second radius R2.

The shaft 4 is for example disposed on a third circle centered on the first axis A10 and having a third radius R3. More particularly, the third circle passes through the axis A4 of the shaft 4.

Figure 3:
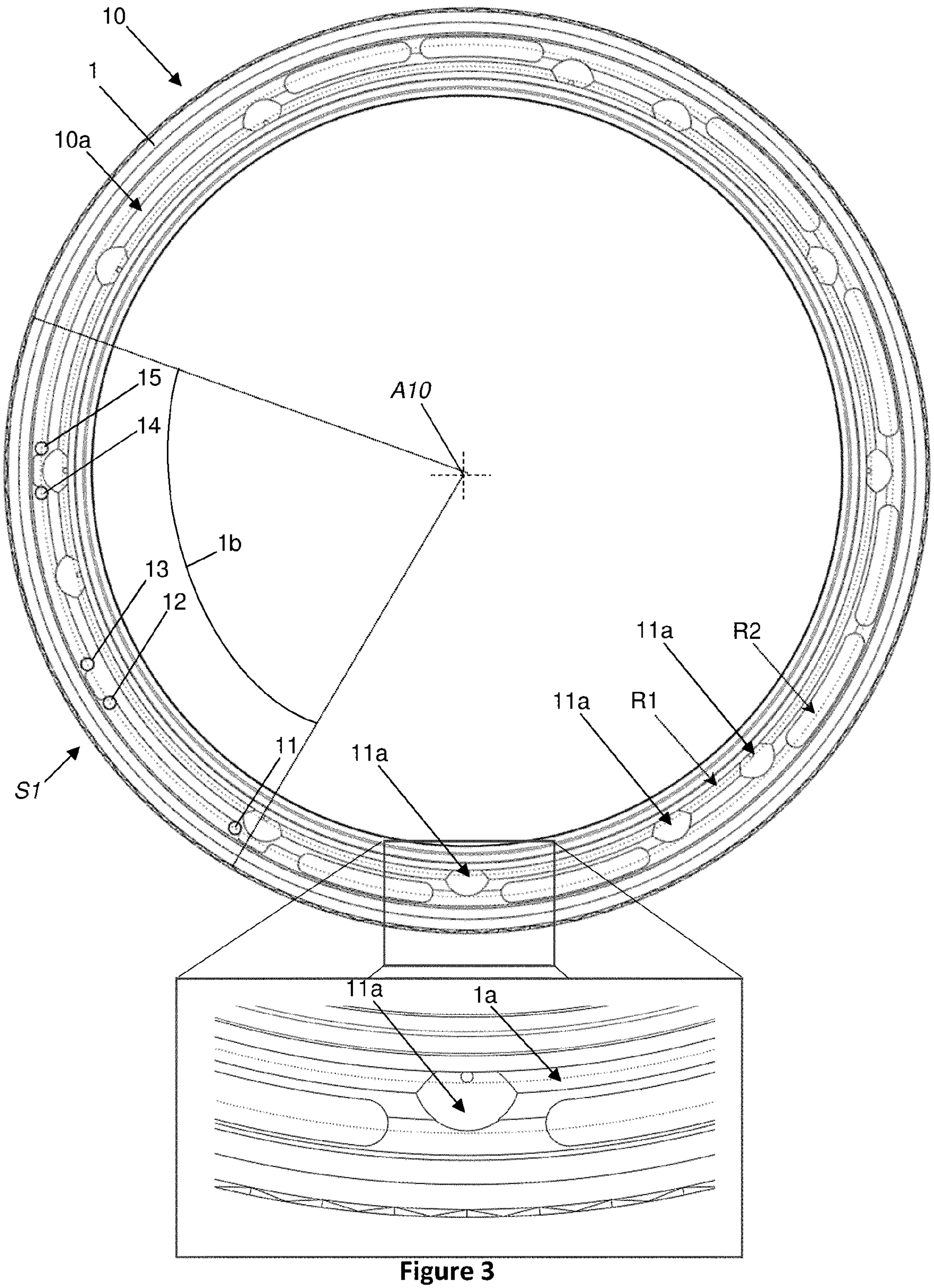
FIG. 3 is a bottom view of the bezel of the first embodiment of the timepiece.

For example, these elements 1*b* take the form of pins or studs 11, 12, 13, 14, 15, as illustrated in FIG. 3, provided to cooperate with a Maltese cross or a pinion formed on the second portion 4*b* of the shaft 4 as illustrated in FIG. 5. These pins protrude from the bottom face 10*a* of the bezel 10 toward the annular seat 3*a* of the middle 3, and are disposed on a second circle centered on the first axis A10 and having a second radius R2.

In the first embodiment, the first radius R1 is smaller than the second radius R2. Preferentially, the ratio of the radii R2/R1 is less than 1.2, even less than 1.1.

In the first embodiment of the bezel 10 which is illustrated, the pins 11, 12, 13, 14, 15 are distributed over an angular segment S1 of the bottom face 10*a* of the bezel. Obviously, these pins could be distributed, in particular evenly distributed, over the entire revolution of the bezel. These pins can be made of a piece with the ring 1 of the bezel 10. Alternatively, these pins can be driven or riveted or brazed or welded in the bezel ring or in the bezel.

The guiding and/or the braking of the bezel 10 is applied through the frustoconical surface 1*a* which cooperates with the pressing elements 51, 52, 53, each mounted on its helical spring 61, 62, 63. The pressing elements press on the frustoconical surface. The arrangement of the frustoconical surface 1*a* and of the pressing elements generates mechanical forces from the pressing elements on the frustoconical surface 1*a*, which have radial components relative to the axis A10 and which are oriented toward the outside of the case. Such a configuration makes it possible to produce a good rotational guidance of the bezel about the axis A10 relative to the middle.

The angular indexing of the bezel 10 according to the axis A10 is, for its part, applied by hollows 11*a* (more particularly visible in FIG. 3) formed locally on the frustoconical surface 10*a* and which are intended to cooperate with the pressing elements 51, 52, 53 under the effect of the helical springs 61, 62, 63. Thus, the frustoconical surface need not be continuous but may be composed of several portions of surface disposed on a same cone. Such an indexing allows the bezel 10 to be positioned in one or more stable angular positions corresponding to one or more horological movement function selections. Obviously, such angular indexing is not essential.

For its part, the bezel 10 is maintained vertical by a ring 7 added onto the middle 3 via a case sealing packing 91, 92 at the glass 8. The packing is for example composed of a seal 91 and a ring 92. More particularly, the bezel 10, notably the ring 1, comprises a groove 1*c* in which at least a portion of ring 7 is planned to be housed.

A second embodiment of a timepiece 200' is described hereinbelow with reference to FIGS. 6 to 8.

The timepiece 200' is, for example, a watch, in particular a wristwatch.

The timepiece 200' comprises a horological movement intended to be mounted in a timepiece case 100' in order to protect it from the outside environment.

The horological movement can be an electronic movement or a mechanical movement, notably an automatic movement.

The timepiece case 100' comprises:

a middle 3', a bezel 10', a case back, and a glass 8'.

The bezel is a rotating bezel, that is to say a bezel that is movable in rotation about an axis A10' relative to the rest of the timepiece case, notably relative to the middle 3' on which it is mounted.

The middle 3' is provided with an annular seat 3*a*' which comprises different housings 31', 32', 33' in which are arranged pressing elements 51', 52', 53', such as balls, each mounted on a helical spring 61', 62', 63'. This seat 3*a*' also comprises a housing 34' in which is housed a shaft 4' on an axis A4' parallel or substantially parallel to the axis A10' of rotation of the bezel 10'. This shaft 4' is movable in translation on the axis A4'.

The rotating bezel 10' for a case 100' of a timepiece 200' comprises:

a first axis A10', and a single frustoconical surface 1*a*' centered on the first axis A10' and intended to be acted upon by at least one pressing element 51', 52', 53' at an interface 110' between the bezel 10' and the middle 3', notably at an interface 110' between the bezel 10' and the seat 3*a*' of the middle 3'.

Preferably, the bezel has a form of revolution or substantially of revolution about the axis A10'.

In the second embodiment, the bezel 10' comprises, for example:

a first bezel ring 1', notably a bottom ring, a second bezel ring 99', notably a top ring, and at least one decorative element 2', like a disk.

For example, the second bezel ring 99' is held against the first bezel ring 1' by the action of the at least one decorative element 2'. For example, the decorative element 2' is snap-fitted onto the first ring 1', and the second ring 99' is housed and held between the first ring 1' and the decorative element 2'.

The first ring 1' comprises:

a top face 10*b*' hollowed in order to receive the second ring 99', and a bottom face 10*a*' having the frustoconical surface 1*a'*.

Figure 6:
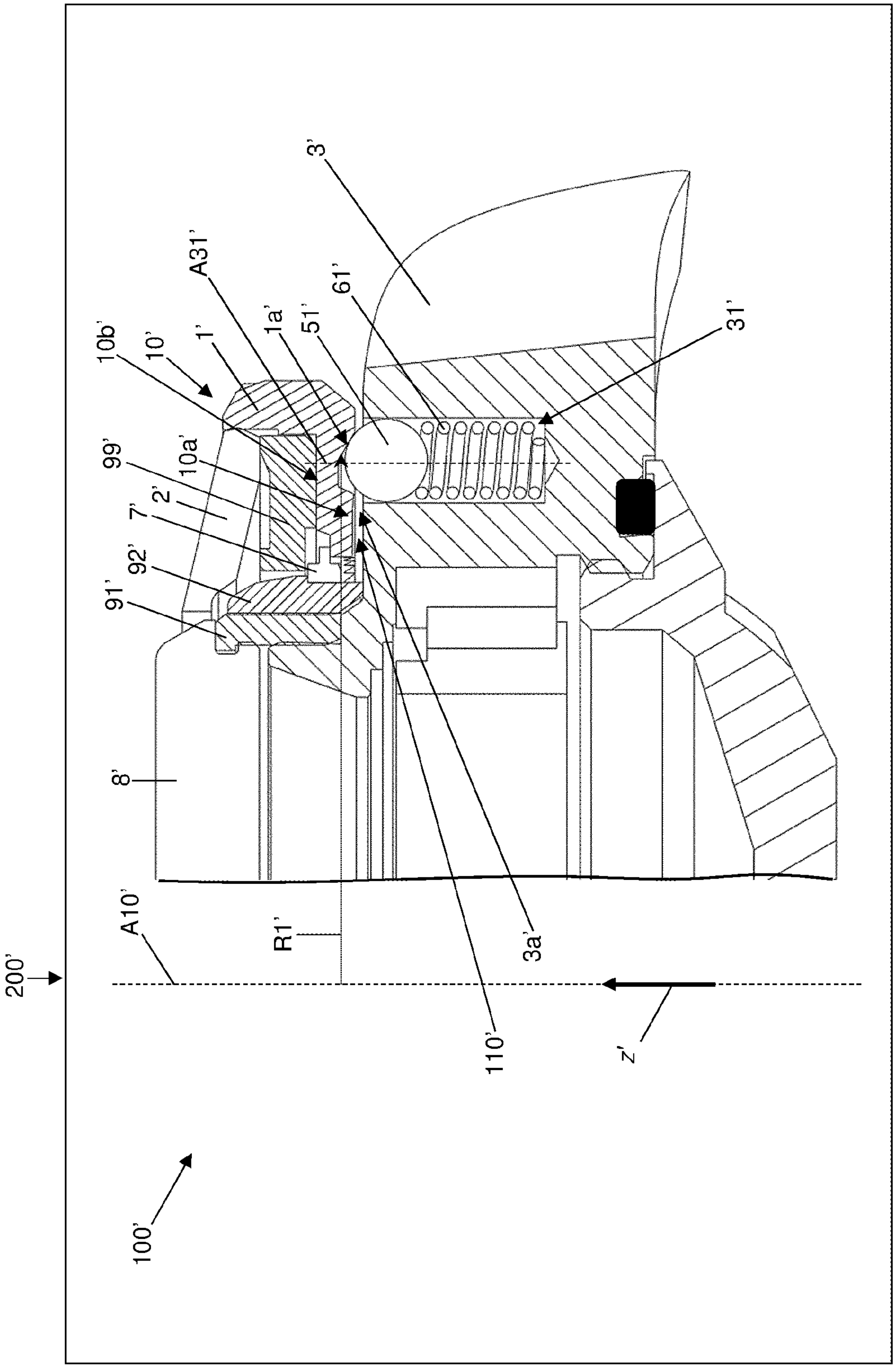
FIG. 6 is a partial radial cross-sectional view of a second embodiment of a timepiece.

FIG. 6 illustrates a radial timepiece case section passing through the axis A31' of the housing 31' formed on the annular seat 3*a*' of the middle 3'. The ball 51' is pressed by the spring 61' against the frustoconical surface 1*a*'. Preferentially, the case 100' comprises at least three balls 51', 52', 53', each returned elastically by a spring 61', 62', 63'. A punctual contact is formed between the ball 51' and the frustoconical surface 1*a*'. The same advantageously applies with respect to the other pressing elements 52', 53' respectively returned elastically against the frustoconical surface 1*a*' by their springs 62' and 63'. The frustoconical surface 1*a*' formed on the bottom surface 10*a*' of the first bezel ring 1' is, here, disposed on a first circle, of a first radius R1', centered on the axis A10' of the bezel 10'.

Preferably, the frustoconical surface 1*a*' forms an angle α' (half-angle at the vertex of the frustoconical surface) of between 30° and 80° with a vector z' arranged along the direction of the axis A10' or with the axis A10'. By convention, this vector z' is oriented from the bottom of the case 100' toward the glass 8' of the case 100'. In the second embodiment as illustrated, the frustoconical surface 1*a*' is oriented in such a way that it approaches the axis A10' in the direction defined by the vector z'. In other words, the single frustoconical surface 1*a*' has a vertex oriented toward the top of the bezel.

Figure 7:
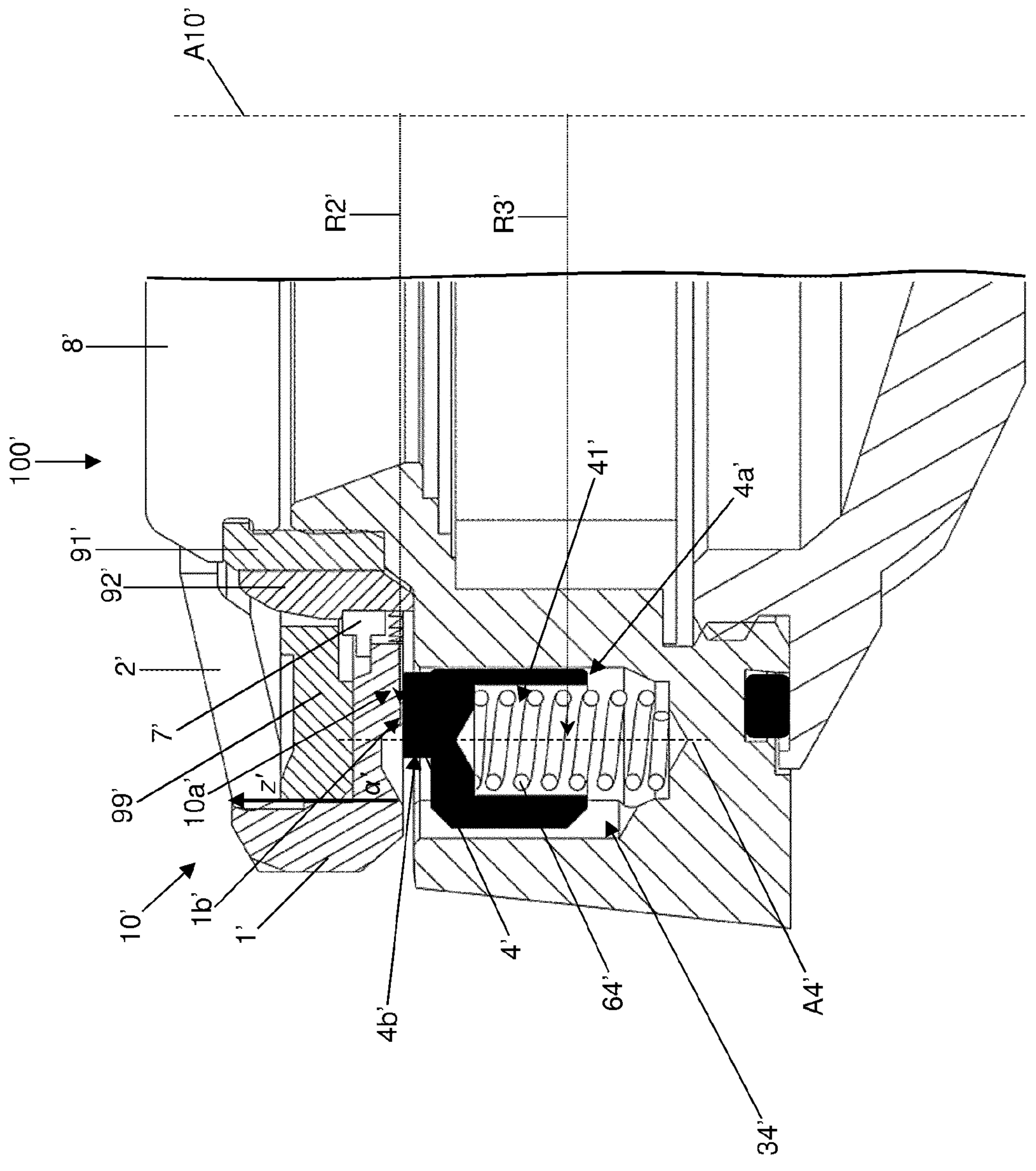
FIG. 7 is another partial radial cross-sectional view of the second embodiment of the timepiece.
Figure 8:
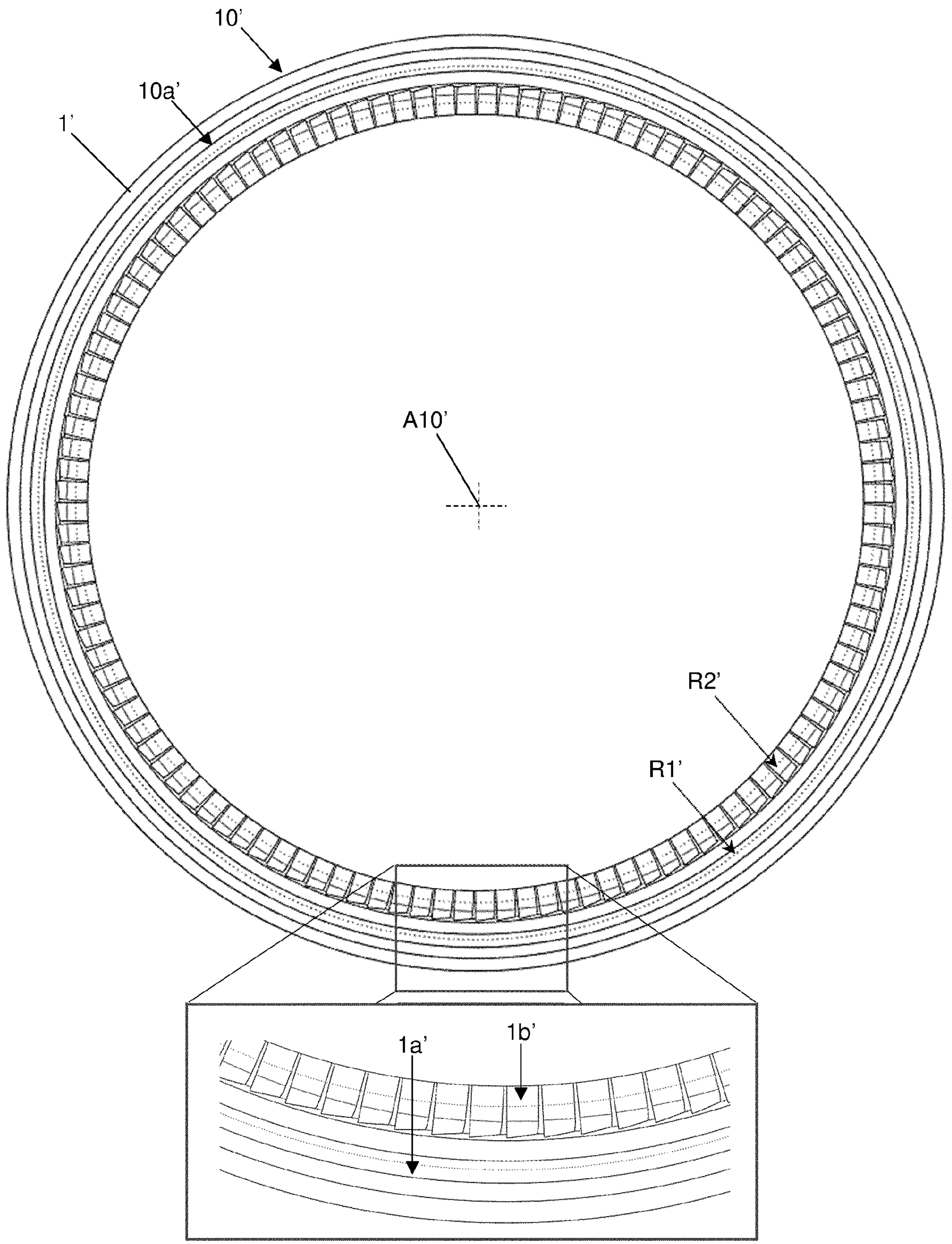
FIG. 8 is a bottom view of the bezel of the second embodiment of the timepiece.

The shaft 4' housed in the opening 34' of the annular seat 3*a*' of the middle 3', is provided to cooperate with a rim toothing 1*b*' formed on the bottom face 10*a*' of the bezel 10' as illustrated in FIG. 7. For this, a first longitudinal end 4*a*' of the shaft 4' is in contact with a helical spring 64' in order for the latter to be able to elastically return a second longitudinal end 4*b*' of the shaft 4' against the toothing 1*b*' of the bezel 10'. Thus, the shaft 4' can be displaced in translation in a direction parallel to its axis A4' under the combined effect of the toothing 1*b*' of the bezel 10' and of the spring 64'.

The shaft 4' is for example disposed on a third circle centered on the first axis A10' and having a third radius R3'. More particularly, the third circle passes through the axis A4' of the shaft 4'.

In the second embodiment more particularly illustrated in FIG. 7, the spring 64' is housed in an opening 41' formed from the end 4*a*' of the shaft 4'. Moreover, the end 4*b*' takes the form of a tooth 4*b'*.

The toothing 1*b*' can be symmetrical or not. The tooth 4*b*' can be symmetrical or not. Moreover, the toothing is disposed at a second radius R2' of a second circle centered on the axis A10' of rotation of the bezel 10'.

The guiding and/or the braking of the bezel 10' is applied through the frustoconical surface 1*a*' which cooperates with the pressing elements 51', 52', 53', each mounted on its helical spring 61', 62', 63'. The pressing elements press on the frustoconical surface 1*a*'. The arrangement of the frustoconical surface 1*a*' and of the pressing elements generates mechanical forces from the pressing elements on the frustoconical surface 1*a*', which have radial components relative to the axis A10' and which are oriented outward. Such a configuration makes it possible to produce a good rotational guidance of the bezel about the axis A10' relative to the middle.

Such a design makes it possible to arrange the surface 1*a*' and the elements 1*b*', and therefore the balls 51', 52', 53' and the shaft 4', on, respectively, radii R1' and R2' which are close, even very close.

In the second embodiment, the first radius R1' is greater than the second radius R2'. Preferentially, the ratio of the radii R1'/R2' is less than 1.2, even less than 1.1.

As for the first embodiment, the axial hold of the bezel 10' is, for its part, defined by a ring 7' added onto the middle 3' via a case sealing packing at the glass 8'. The sealing packing is composed of a seal 91' and a ring 92'. More particularly, the first and second rings 1' and 99' form a groove 1*c*' in which provision is made to house at least one portion of ring 7'.

Figure 9:
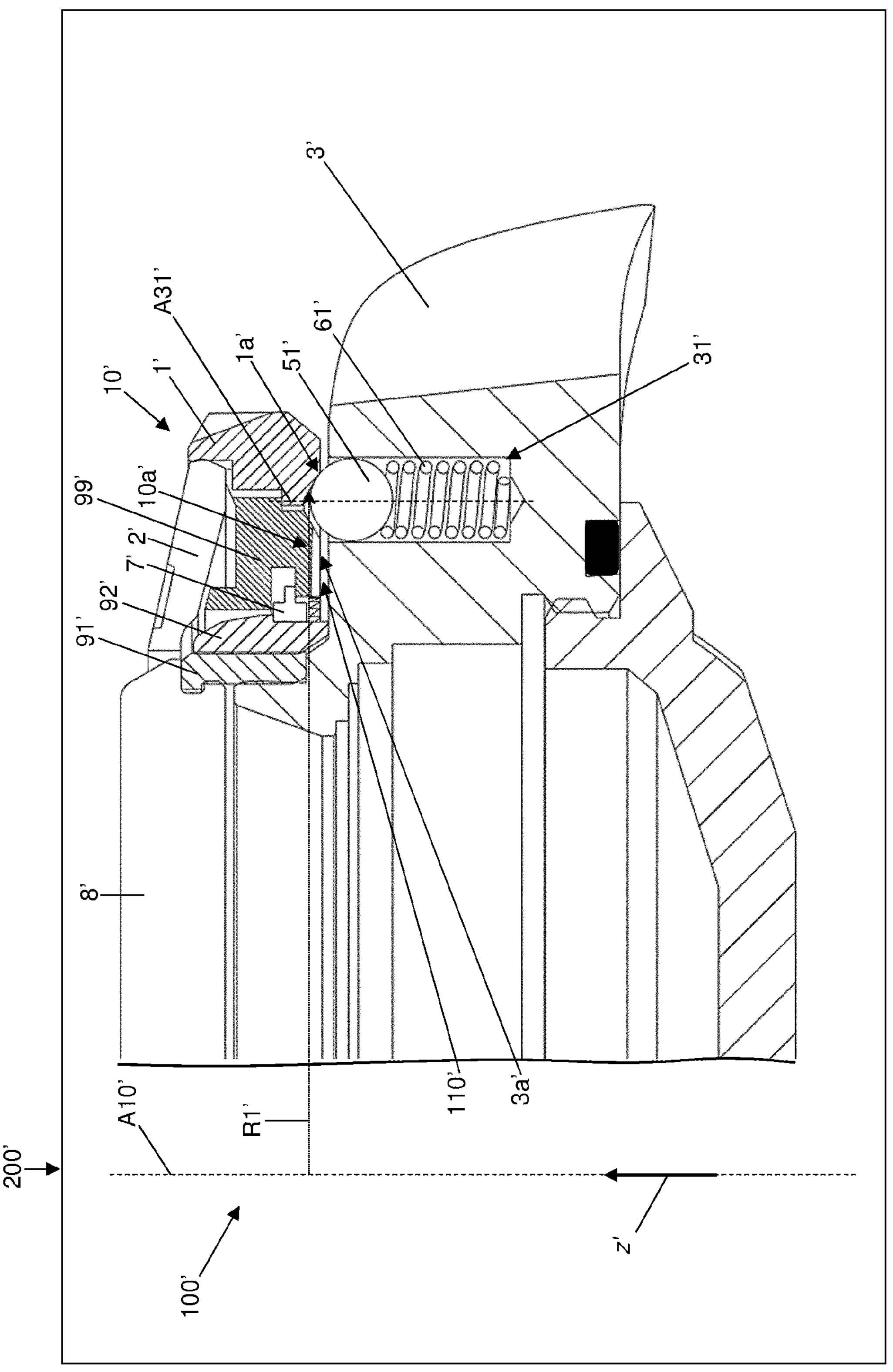
FIG. 9 is a partial radial cross-sectional view of a variant of the second embodiment of a timepiece.
Figure 10:
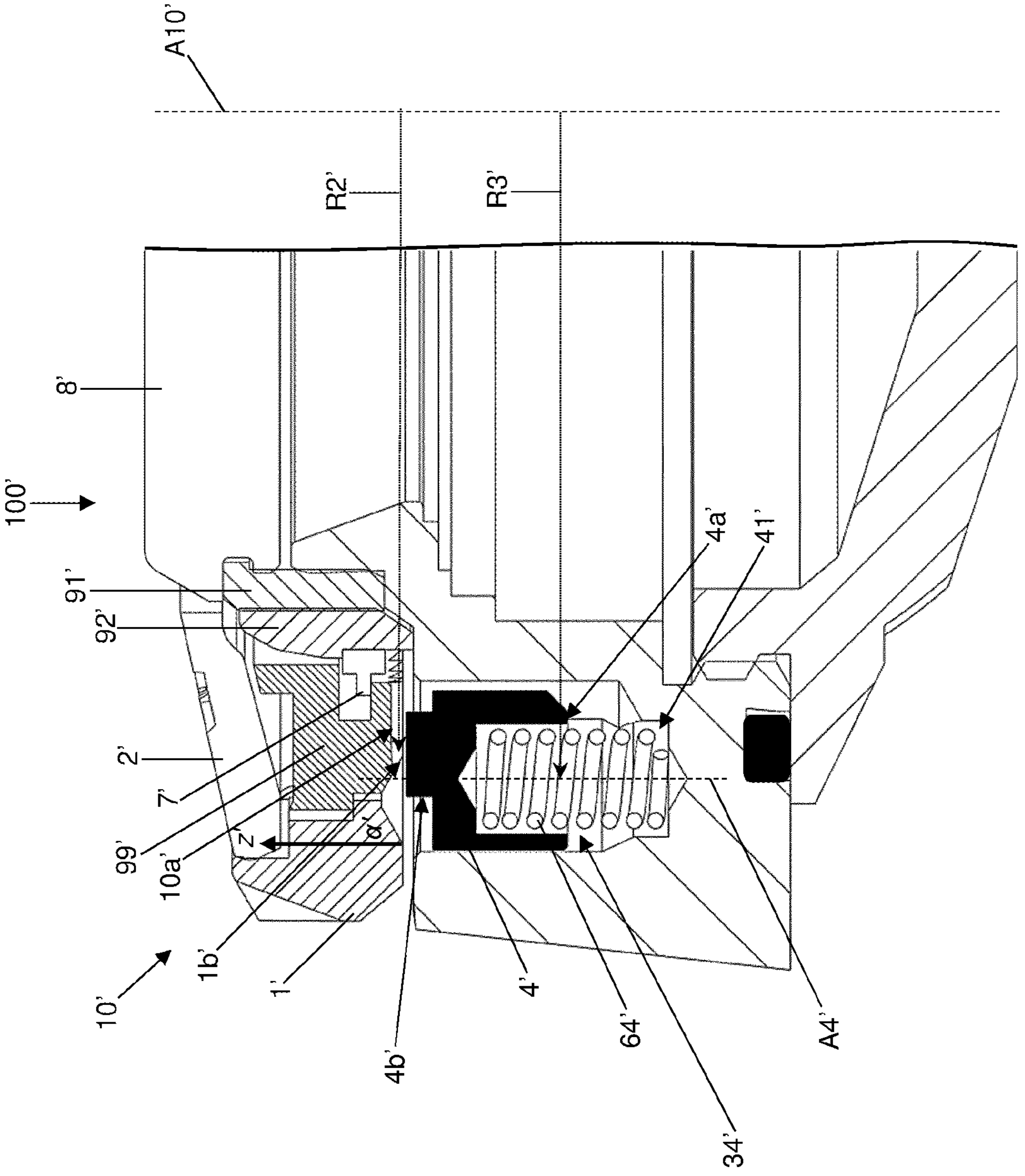
FIG. 10 is another partial radial cross-sectional view of the variant of the second embodiment of the timepiece.
Figure 11:
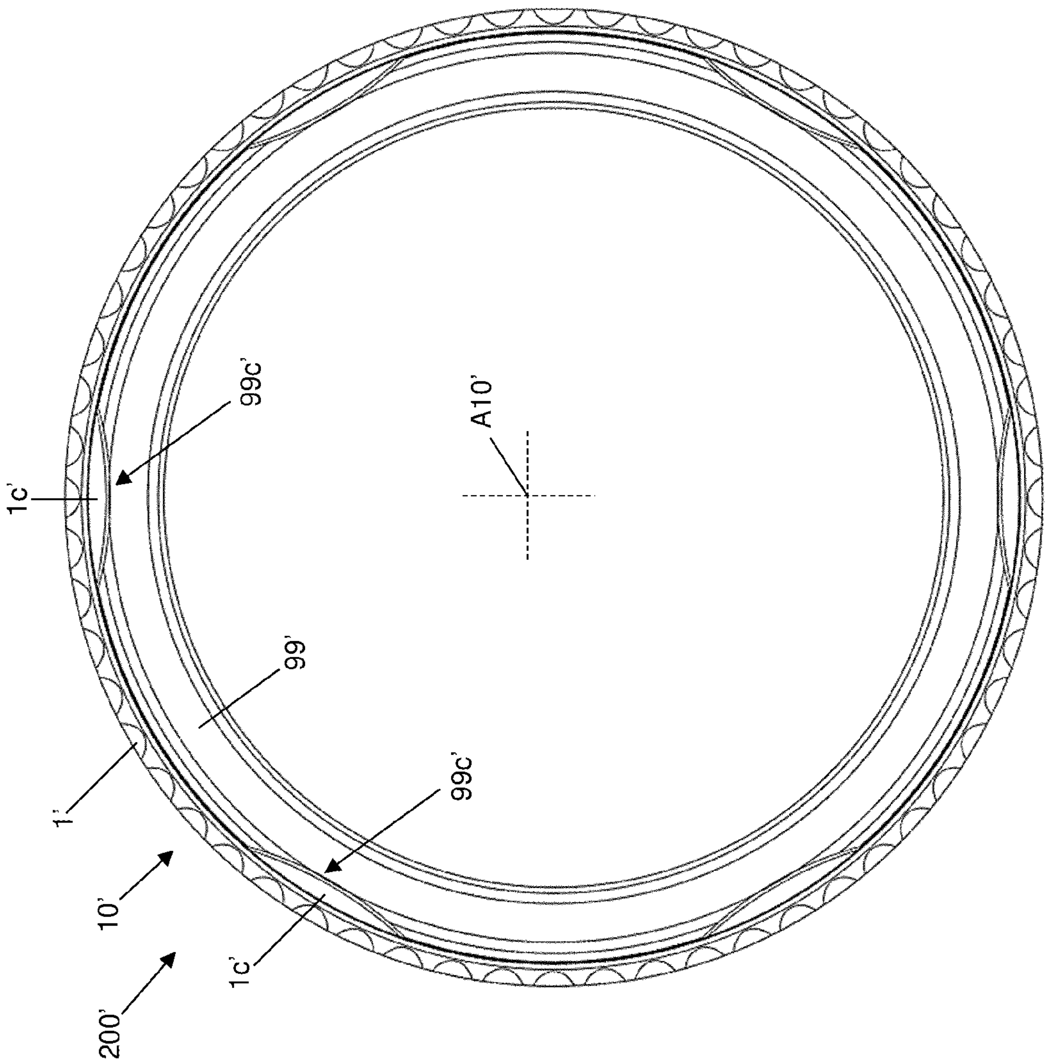
FIG. 11 is a top view of the bezel of the variant of the second embodiment of a timepiece.

A variant of the second embodiment of a timepiece 200' is described hereinbelow with reference to FIGS. 9 to 11. In this variant, the second bezel ring 99' has the particular feature of comprising the rim toothing 1*b*' formed on the bottom face 10*a*' of the bezel 10'. Such a variant embodiment is particularly advantageous to simply the geometry of the first bezel ring 1', and thus simplify the machining thereof.

Overall, the first ring can be seen as an outer ring and the second ring can be seen as an inner ring, because the first ring is disposed around the second ring, in particular relative to the axis A10'.

For example, the second bezel ring 99' is held against the first bezel ring 1' by the action of the at least one decorative element 2'. For example, the decorative element 2' is snap fitted onto the first ring 1', and the second ring 99' is housed and held between the first ring 1' and the decorative element 2'. In this case, the first ring can complementarily or alternatively be seen as a bottom ring and the second ring can be seen as a top ring, because the second ring is introduced into the first ring from the top side of the first ring and the rings are in abutment against one another on a surface of the second ring oriented downward and a surface of the first ring oriented upward (in the direction defined by the vector z').

Alternatively or complementarily, the ring 99' can be secured to the ring 1' by any other means. For example, by driving, riveting, welding or brazing. In order to guarantee the securing of the first ring 1' in rotation with the ring 99', the latter can comprise angular abutment elements. For example, the ring 1' can comprise lobes 1*c'* protruding toward the axis A10', which are provided to cooperate with openings 99*c'* formed at the outer periphery of the ring 99', as can be seen in FIG. 11. Advantageously, the openings 99*c'* have a geometry complementing that of the lobes 1*c'*. Naturally, the lobes could be formed on the ring 99' and the openings could be formed on the ring 1'.

Preferably, throughout this document, "annular seat" is understood to mean a reception surface for a bezel. Preferentially, this surface forms an integral part of the middle. Preferentially, this surface is overall disposed at right angles to the axis of rotation of the bezel, notably apart from the frustoconical surface which has a specific orientation according to the invention.

Preferably, throughout this document, "radial section" is understood to mean a section on a plane passing through the axis of rotation of the bezel. In other words, the axis of rotation of the bezel is contained in such a plane.

Preferably, throughout this document, "guiding and/or braking surface" is understood to mean a surface provided to cooperate with guiding and/or braking elements. These elements can, for example, take the form of balls returned elastically by one or more springs.

Preferably, throughout this document, "radius" is understood preferably to mean a median radius. More particularly, the first radius R1, R1' through which the frustoconical surface 1*a*, 1*a'* passes corresponds to the radius splitting the frustoconical surface 1*a*, 1*a'* into two portions whose areas are equal or substantially equal. Moreover, the second radius R2 through which the elements 1*b* pass passes more particularly through the center of the pins or studs 11, 12, 13, 14, 15. Moreover, the second radius R2' through which the elements 1*b* pass corresponds to the radius splitting the rim toothing 1*b'* into two portions whose areas are equal or substantially equal.

Throughout this document, "angular indexing" or "indexing of the bezel" is understood to mean the definition of different stable angular positions of the bezel relative to the middle. These stable positions can be separated by a continuum of unstable intermediate positions. Between two stable positions or two indexed positions or two indexing positions, the bezel passes transiently through a continuum of unstable intermediate positions. The bezel can leave a stable position only if a torque greater than a threshold torque is exerted on the bezel, whereas the bezel can leave an unstable position when a torque less than this threshold torque is exerted on the bezel.

Throughout this document, the terms "first", "second" and "third" in the expressions "first radius", "second radius", and "third radius" have a distinctive meaning and not a temporal meaning or a position-related meaning.

In the two embodiments described, the pressing elements are balls. However, the pressing elements or certain pressing elements can also be studs or shafts, notably studs or shafts that have a hemispherical or substantially hemispherical end.

In the two embodiments described, three pressing elements are implemented. However, the watch case can have more than three pressing elements, notably four, five or six pressing elements acting on the bezel.

Whatever the variants and embodiments, the different pressing elements are preferably evenly distributed about the axis A10; A10', that is to say that the pressing elements are disposed symmetrically relative to one or more planes passing through the axis A10; A10' or according to a symmetry of rotation about the axis A10; A10'.

In the two embodiments described, the single frustoconical surface has a vertex oriented toward the top of the bezel. However, the single frustoconical surface could alternatively have a vertex oriented toward the underside of the bezel. The underside of the bezel corresponds here to the bottom face of the bezel, namely the face of the bezel that is not visible when the latter is mounted on the middle. In other words, the vertex of the conical surface in extension of the single frustoconical surface is located below the bottom face of the bezel. In such an embodiment, the arrangement of the frustoconical surface and of the pressing elements creates mechanical forces from the pressing elements on the frustoconical surface which have radial components relative to the axis A10; A10' and which are oriented toward the interior of the case.

Whatever the variants and embodiments, the bezel can present hour or time-derivative information. Such information can be borne by a decorative element of the bezel.

In the two embodiments described, the mechanical actions exerted by the pressing elements on the frustoconical surface are contact actions.

However, the actions could alternatively be actions at a distance, such as magnetic forces.

Whatever the variants and embodiments, the rotating bezel comprises a single frustoconical surface 1*a* centered on the first axis A10; A10' and intended to be acted upon by at least one pressing element. That excludes the rotating bezel from comprising two frustoconical surfaces centered on the first axis and each intended to be acted upon by a pressing element. This excludes in particular two frustoconical surfaces centered on the first axis and forming a radial bezel section having a V-shaped form in which one or more pressing elements could press simultaneously on the two flanks of the V. As seen previously, the single frustoconical surface can be composed of several portions of a same conical surface. By virtue of such a geometry, the radial bulk necessary to the implementation of the guiding means and of the indexing means of the bezel can be limited. In particular, this makes it possible to have the frustoconical surface cohabit with bezel indexing elements and/or actuation elements, notably for a bezel whose bottom face has a small surface extent, while offering performance levels in terms of guidance and/or braking that are at least equivalent to those of the solutions known from the prior art. The annular section of the bezels according to the invention can therefore be minimized. Such a design is particularly advantageous for the definition of a rotating bezel arranged in a case of small diameter provided with a middle comprising an annular seat whose section is minimized and/or for the definition of a set rotating bezel.

The invention claimed is:

1. A timepiece case comprising a middle, a rotating bezel, and at least one pressing element at an interface between the middle and the bezel, the bezel comprising:

a first axis, and a frustoconical surface centered on the first axis, wherein the at least one pressing element applies pressure on the frustoconical surface of the bezel, and the at least one pressing element does not apply pressure on any other surface of the bezel.

2. The timepiece case as claimed in claim 1, wherein the frustoconical surface has an angle with the axis in a range of from 30° to 80°.

3. The timepiece case as claimed in claim 1, wherein the frustoconical surface has a vertex oriented toward a top of the bezel.

4. The timepiece case as claimed in claim 1, wherein the frustoconical surface has a vertex oriented toward a bottom of the bezel.

5. The timepiece case as claimed in claim 1, wherein the bezel comprises indexing or actuation elements disposed on a second circle centered on the first axis and having a second radius.

6. The timepiece case as claimed in claim 1, wherein the at least one pressing element comprises a ball or a pressing element having a hemispherical or substantially hemispherical end.

7. The timepiece case as claimed in claim 1, wherein the at least one pressing element is disposed on a first circle centered on the first axis and having a first radius.

8. The timepiece case as claimed in claim 5, wherein the timepiece case comprises a shaft having a second axis parallel or substantially parallel to the first axis, the shaft being arranged to cooperate with the indexing or actuation elements and the shaft.

9. The timepiece case as claimed in claim 8, wherein the shaft is movable in rotation about the second axis.

10. The timepiece case as claimed in claim 9, wherein the indexing or actuation elements form pins adapted to cooperate with a pinion or a Maltese cross secured to the shaft.

11. The timepiece case as claimed in claim 8, wherein the shaft is movable in translation on the second axis.

12. The timepiece case as claimed in claim 11, wherein the indexing or actuation elements form a toothing provided to cooperate with a tooth secured to the shaft.

13. The timepiece case as claimed in claim 7, wherein a ratio:

of the largest of the first and second radii to the smallest of the first and second radii is less than 1.2.

14. A timepiece comprising the timepiece case as claimed in claim 1.

15. The timepiece case as claimed in claim 8, wherein the second axis is disposed on a third circle centered on the first axis and having a third radius.

16. The timepiece case as claimed in claim 2, wherein the single frustoconical surface has a vertex oriented toward a top of the bezel.

17. The timepiece case as claimed in claim 2, wherein the single frustoconical surface has a vertex oriented toward a bottom of the bezel.

18. The timepiece case as claimed in claim 2, wherein the bezel comprises indexing or actuation elements disposed on a second circle centered on the first axis and having a second radius.

19. The timepiece case as claimed in claim 3, wherein the bezel comprises indexing or actuation elements disposed on a second circle centered on the first axis and having a second radius.

20. The timepiece case as claimed in claim 1, wherein the frustoconical surface is composed of several portions of a same conical surface.

* * * * *